Jan. 27, 1970    H. W. STARKWEATHER, JR    3,492,367
POLYAMIDE STRAPPING OF IMPROVED FRICTION WELDABILITY
CONTAINING A MINOR PORTION OF ETHYLENE-METHACRYLIC
ACID COPOLYMER

Filed Nov. 27, 1967                            2 Sheets-Sheet 1

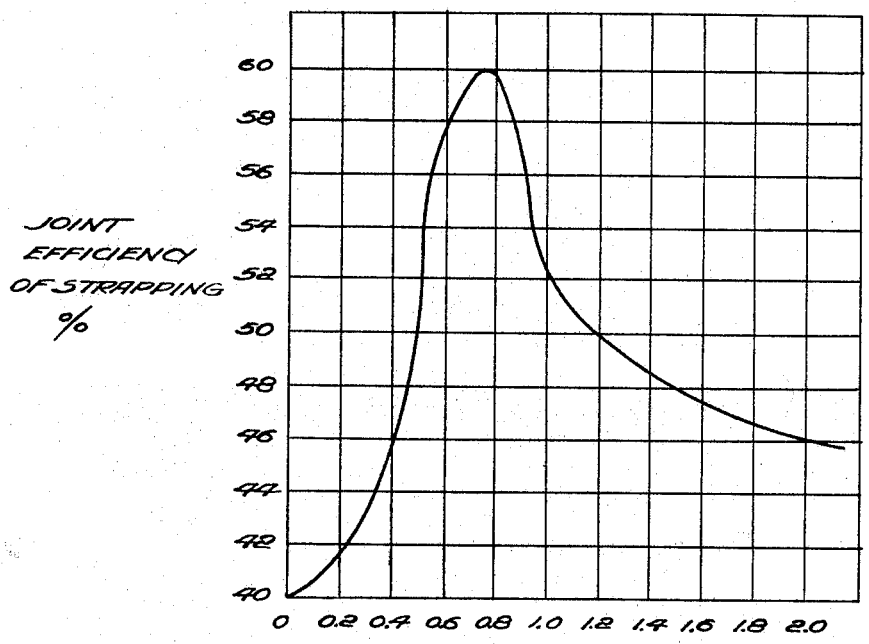

United States Patent Office 3,492,367
Patented Jan. 27, 1970

3,492,367
POLYAMIDE STRAPPING OF IMPROVED FRICTION WELDABILITY CONTAINING A MINOR PORTION OF ETHYLENE - METHACRYLIC ACID COPOLYMER
Howard Warner Starkweather, Jr., Sharpley, Wilmington, Del., assignor to E. I. du Pont de Nemours and Company, Wilmington, Del., a corporation of Delaware
Filed Nov. 27, 1967, Ser. No. 685,770
Int. Cl. C08g 41/04
U.S. Cl. 260—857                    2 Claims

ABSTRACT OF THE DISCLOSURE

The friction weldability of polyamide strapping is improved when the polyamide resin of which the strapping is composed contains a small amount of ethylene/acid copolymer, e.g., ethylene/methacrylic acid copolymer.

---

This invention relates to plastic strapping and more particularly to a process for improving the friction weldability of polyamide strapping.

The strapping made of oriented polyamide resin, such as described in U.S. Patent No. 3,354,023 to Dunnington, et al. has become highly useful as a replacement for steel strapping in many applications. In use, polyamide strapping is tightened around an article and the strapping ends are fastened together to remain in the tightened condition. Separate fasteners have been used for this purpose. Recently, however, a fastening technique for polyamide strapping has been developed which does not require separate fasteners. This technique has been named friction welding and is described in detail in the publication by the Signode Corporation, identified as SPD 360 7/66-10M-A, entitled "An Introduction to Tension Weld —The Process, The Tool, The Weld Itself."

To summarize the friction welding technique as it is described in the publication, the ends of the polyamide strapping are overlapped while the strapping is under tension and are positioned between a pair of gripping jaws which are longitudinally oscillatable with respect to each other. By relative oscillation of the jaws, the strap ends positioned therebetween rub together under controlled speed, pressure, tension and for a sufficient time to cause the polyamide resin at the strapping surfaces to melt, whereby upon cooling, the surfaces weld together. Because this melting is localized at the strapping surfaces being rubbed, the orientation of the polyamide resin in the inner region or main body of the strapping, which gives the strapping its strength, is not destroyed. Unfortunately, however, the strength of the weld is significantly less than the strength of the strapping, thereby impairing efficient use of friction-welded strapping.

The present invention provides a method for increasing the strength of this weld or in other words, increasing the friction weldability of the polyamide strapping. This method comprises conducting the friction welding operation with polyamide strapping wherein the polyamide resin forming the strapping contains a small amount of ethylene/acid copolymer blended therewith.

The improved friction weldability can be expressed in terms of "percent joint efficiency" which equals $$\frac{\text{lb. break load of welded joint}}{\text{lb. break load of original strap}} \times 100$$

For polyamide strapping wherein no other polymeric component is present, the joint efficiency is about 40 percent. When about 0.75 percent by weight of ethylene/acid copolymer is present in the strapping, as a blend with the polyamide resin, a maximum improvement appears to occur, providing a joint efficiency of 55 percent and higher preferably at 58 percent. As the proportion of copolymer is decreased or increased from 0.75 percent by weight, the joint efficiency declines. Below 0.3 percent and above 5 percent by weight of copolymer, the improvement is negligible. "Percent by weight" as used herein is based on the total weight of the blend. Blends of polyamide with ethylene/acid copolymer oriented into strapping are disclosed in British Patent No. 998,439, but such strapping has not displaced strapping of polyamide resin as the sole polymeric component in commerce.

The present invention will be discussed more fully hereinafter with respect to the drawings in which:

FIG. 5 shows the effect of ethylene/acid copolymer content on joint efficiency of the friction weld.

Figure 1:
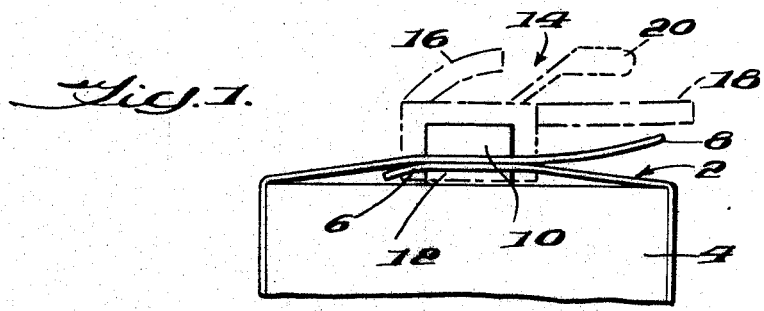
FIG. 1 shows in side elevation, strapping of the present invention in operative position for friction welding.

With respect to the drawings, FIG. 1 shows strapping 2 of the present invention tensioned around an article 4 to be strapped and having one end 6 overlapped with the opposite end 8 which continues onto a reel (not shown). The overlapping ends 6 and 8 are gripped between a pair of jaws 10 and 12 which press the overlapping ends together. These jaws are part of a machine 14, which can be, but is not limited to, the tool described in the Signode publication hereinbefore described, shown in phantom lines, which accomplishes the friction weld. The machine 14 can be equipped, for example, with a lever mechanism 16 for tightening the strapping around the article 4, a line 18 for compressed air for powering the machine, and a lever mechanism 20 for actuating the machine.

Figure 2:
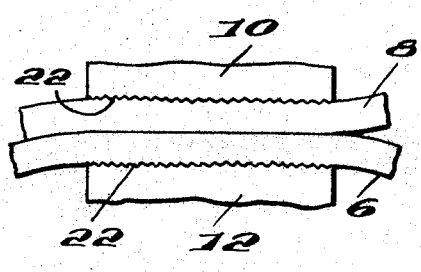
FIG. 2 shows an enlarged view of the overlapped portion of the strapping shown in FIG. 1 and the machine jaws gripping this portion.
Figure 3:
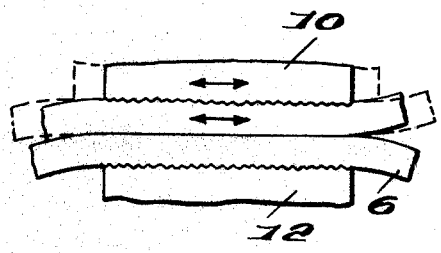
FIG. 3 shows the relative oscillation of the jaws shown in FIG. 2 to obtain friction welding of the overlapped portions of the strapping.
Figure 4:
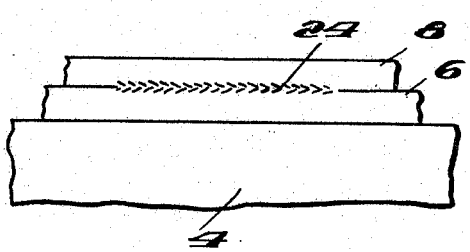
FIG. 4 shows the strapping with the friction weld completed and the jaws removed.

As shown in greater detail in FIG. 2, the jaws 10 and 12 have ridged or otherwise roughened surfaces 22 gripping the opposing faces of ends 6 and 8 of the strapping. Longitudinal oscillation of jaw 10 shown by the phantom line positions in FIG. 3 causes the strapping end 8 to move longitudinally and to repeatedly rub the mating surface of the strapping end 6 which is held stationary by jaw 12. The friction existing between these contiguous surfaces heats and eventually melts the strapping at these surfaces, causing them to weld together, as indicated by the weld line 24 shown in FIG. 4, when the lateral oscillation of jaw 10 is stopped. The low thermal conductivity of the strapping confines the melting to the surfaces being rubbed, thereby retaining the orientation in the main body of the strapping.

The present invention is not limited to any particular operating conditions insofar as obtaining the friction weld is concerned. The gripping pressure and amplitude and duration of rubbing are selected to accomplish the desired result. Representative conditions are given in the Signode publication hereinbefore described and in the examples herein.

The polyamide resin component of the strapping generally has a molecular weight in excess of about 2000 and is capable of sufficient orientation to provide the strength required for the strapping application involved. Representative polyamide resins include polyhexamethylene adipamide, polyhexamethylene sebaceamide, polycaprolactam and copolymers thereof. The polyamide resins can include such additives as plasticizers, antioxidants and other conventional additives, such as described in British Patent No. 1,017,175.

The ethylene/acid copolymer component of the strapping is a copolymer of ethylene with from 0.5 to 25 percent by weight of an alpha-beta monoethylenically unsaturated carboxylic acid. It has a number average molecular weight of at least 10,000 (measured by asmomotry). Usually the copolymer used will have a melt index of between 0.1 and 100. The copolymer is made by copolymerizing the ethylene and the carboxylic acid, preferably following the procedure of British Patent No. 963,380 to give a copolymer in which the acid derived units are randomly distributed along the copolymer chain. The carboxylic acid monomer need not be in the acid form but can be in a form which yields the acid function in the copolymer chain. Preferably, the carboxylic acid has from 3 to 8 carbon atoms. Suitable acids include the mono- and the di-carboxylic acids, including compounds convertible thereto in the copolymer chain, such as acrylic, methacrylic, maleic and fumaric acids and the monoalkyl esters and the anhydrides thereof. The preferred copolymer is of ethylene with from 2 to 10 mole percent of methacrylic acid. The copolymer can include from 0.01 to 10 percent of the third ethylenically unsaturated monomers disclosed in U.S. Patent No. 3,201,374 to Simms.

The best improvement in friction weldability occurs for strapping of blends containing about 0.75 percent by weight of the ethylene/acid copolymer. As shown by the curve in FIG. 5, the joint efficiency of the strapping increases from 40 percent with increasing copolymer content up to about 0.75 percent by weight, and at higher contents the joint efficiency declines. Some improvement is obtained with as little as 0.3 percent by weight copolymer. A similar improvement is obtained as high as 5.0 percent by weight. These values encompass the useful range of copolymer content insofar as improved friction weldability is concerned. Preferably, a joint efficiency of at least 50 percent is desired, which is obtained at 0.5 percent by weight copolymer content. More improvement occurs in selecting contents along the curve between 0.5 percent and its peak. Compositions lying along the opposite side of the peak of the curve offer no advantage. From 0.5 to 0.95 percent by weight of copolymer encompasses the preferred range and from 0.5 to 0.9 percent by weight of copolymer encompasses an even more preferred range.

It is generally desirable to have the strapping colored. The amount of colorant present will depend on the colorant used and the particular color intensity desired. Carbon black is the colorant most often used. In a preferred embodiment, the colorant and ethylene/acid copolymer are pre-blended to form a color concentrate and sufficient of this concentrate is then blended with the polyamide resin to supply the ethylene/acid copolymer component of the blend. The amount of colorant present in the concentrate will generally fall between 5 and 60 percent by weight based on the weight of the concentrate, with the exact amount used being dependent on the dispersibility of the colorant in the ethylene/acid copolymer and on the color level desired in the polyamide strapping. Generally, sufficient colorant to opacify the polyamide strapping is desired. From 0.1 to 0.5 percent by weight of colorant based on the weight of the blend is usually satisfactory; higher amounts can be used, e.g., up to 2.0 percent by weight, can be used to improve weatherability.

The blends of polyamide resin and ethylene/acid copolymer can be prepared by mixing together colorant and ethylene/acid copolymer in a Banbury mixer or on a two-roll mixer at temperatures of about 150° C. for a sufficient time to obtain uniform dispersion. The concentrate can then be comminuted into granules of convenient size for either dry or melt blending with granules of polyamide resin. The same technique can be used for blending ethylene/acid copolymer without colorant with polyamide resin. The melt blend can either be extruded into the ribbon shape for orientation or the extrudate can be comminuted into granules for re-extrusion or molding by other methods. The ribbon shape can be made such as by the molding process disclosed in U.S. patent application Ser. No. 619,994, filed Mar. 2, 1967 by Fields and Hartig, or by the extrusion process disclosed in U.S. Patent No. 3,354,023.

The present invention is not limited to any particular form of longitudinal orientation of the blend into strapping. The preferred orientation, however, is the roll orientation disclosed in U.S. Patent No. 3,354,023 (British Patent No. 1,017,175). Other methods of orientation such as stretching and die drawing can be used individually or in combination with each other or with roll orientation. In any event, the degree of longitudinal orientation is generally sufficient so that the strapping has a tensile strength of at least 50,000 p.s.i. measured on a conventional test machine. This corresponds to a deformation ratio of at least about 4 (weight per unit length before orientation divided by weight of same length, the width remaining constant, after orientation). The strapping will generally have a thickness of greater than 0.010 inch and width generally between 0.25 inch and 0.75 inch.

The following examples are illustrative of the present invention; however, the invention is not intended to be limited to these examples. Parts and percents are by weight and weight percents are based on total weights unless otherwise indicated.

EXAMPLES 1–6

Example 1 is a control made by blending 15 parts of unpigmented polyhexamethylene adipamide having a relative viscosity of 50 as measured by ASTM test D-789 with one part of the same polyamide containing 2 percent carbon. Example 2 was made with a concentrate containing 59.5 percent of a copolymer of ethylene with 9 percent methacrylic acid having a melt index of 4.0, 40 percent SRF–S furnace black, and 0.5 percent Santonox AO–3 antioxidant. Santonox AO–3 is an antioxidant identified as 4,4' - thio - bis(6-t-butyl-3-methylphenol). Examples 3 through 6 were made with a concentrate containing 79.5 percent of the same copolymer used in Example 2, 20 percent SRF–S furnace black, and 0.5 percent of Santonox AO–3 antioxidant. The remainder of the blend for Examples 3 through 6 was polyhexamethylene adipamide. Strapping is prepared from these blends by extrusion of the blend into ribbon form which is roll oriented in accordance with U.S. Patent No. 3,354,023 to a deformation ratio of about 4.3. The friction weld is obtained using the tool described in the Signode publication, operating at a pressure about 500 lb., oscillating parallel to the length of the strap at an amplitude of 0.05 in. at 6000 cycles/min. for one-half to 4 sec. The contact area between overlapping strapping ends between the jaws of the tool is 1 inch in length times the width of the strap. The breaking load in pounds of the weld and of the strapping, for determining joint efficiency, is determined using an Instron tensile tester using a cross-head speed of 2 inch/min.

TABLE

| Example Number | Percent ethylene/ acid copolymer | Strap dimensions | | Strap tensile strength, p.s.i. | Friction-weld joint strength, lb. force | Joint efficiency, percent |
|---|---|---|---|---|---|---|
| | | Thickness, mils | Width, inch | | | |
| 1 | None | 16.2 | .436 | 68,700 | 196 | 40 |
| 2 | 0.3 | 16.5 | .440 | 67,200 | 212 | 43 |
| 3 | 0.50 | 16.1 | .436 | 65,700 | 231 | 50 |
| 4 | 0.75 | 16.4 | .437 | 65,600 | 280 | 60 |
| 5 | 0.95 | 16.6 | .436 | 63,000 | 242 | 53 |
| 6 | 2.00 | 16.3 | .435 | 62,500 | 205 | 46 |

EXAMPLE 7

A copolymer of ethylene with 16.4 percent methacrylic acid, having a melt index of 3.4 was cube blended with polyhexamethylene adipamide to give a blend containing 5 percent of the copolymer. This blend was extruded into ribbon form which is roll oriented to a deformation ratio of 4.73. The resultant strap was 18.1 mils thick and 0.524 inch wide and had a tensile strength of 67,600 p.s.i. When friction welded in a manner similar to that of Examples 1–6, a joint strength of 267 lb. and a joint efficiency of 42 percent were obtained.

As many apparently widely different embodiments of this invention may be made without departing from the spirit and scope thereof, it is to be understood that this invention is not limited to the specific embodiments thereof except as defined in the appended claims.

What is claimed is:

1. In the process of friction welding polyamide strapping to fasten it under tension about an article, the improvement comprising conducting said process with said strapping wherein the polyamide resin from which the strapping is made is a blend with from 0.3 to 5.0 percent by weight, based on the total weight of the blend, of a copolymer of ethylene with from 0.5 to 25 percent by weight of an alpha, beta-ethylenically unsaturated carboxylic acid containing from 3 to 8 carbon atoms.

2. In the process of claim 1 wherein from 0.5 to 0.95 percent by weight of said copolymer is present.

References Cited

FOREIGN PATENTS 740,501   8/1966   Canada.

MURRAY TILLMAN, Primary Examiner

PAUL LIEBENMAN, Assistant Examiner

U.S. Cl. X.R.

260—41, 78, 88.1